US010817268B2

(12) United States Patent
Martinez Palleja et al.

(10) Patent No.: US 10,817,268 B2
(45) Date of Patent: Oct. 27, 2020

(54) FRAMEWORK FOR MODELING WITH DOMAIN MODEL CAPABILITIES

(71) Applicant: Red Hat, Inc., Raleigh, NC (US)

(72) Inventors: Roger Martinez Palleja, Barcelona (ES); Mark Proctor, London (GB)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 15/673,803

(22) Filed: Aug. 10, 2017

(65) Prior Publication Data

US 2019/0050207 A1    Feb. 14, 2019

(51) Int. Cl.
G06F 8/35      (2018.01)
G06F 8/34      (2018.01)
G06F 3/0486    (2013.01)
G06F 3/0481    (2013.01)
G06T 11/00     (2006.01)
G06T 11/60     (2006.01)
G06F 3/0484    (2013.01)

(52) U.S. Cl.
CPC .............. G06F 8/35 (2013.01); G06F 3/0486 (2013.01); G06F 3/04812 (2013.01); G06F 8/34 (2013.01); G06F 3/04845 (2013.01); G06T 11/001 (2013.01); G06T 11/60 (2013.01); G06T 2200/24 (2013.01)

(58) Field of Classification Search
CPC .......... G06F 8/35; G06F 8/34; G06F 3/04845; G06F 3/04812; G06F 3/0486; G06T 11/001; G06T 11/60; G06T 2200/24
USPC ....................................................... 717/105
See application file for complete search history.

(56) References Cited

U.S. PATENT DOCUMENTS 5,862,379 A * 1/1999 Rubin ................ G06F 8/34
                                                    717/109
6,151,022 A * 11/2000 Alshibani ............ G06F 9/454
                                                    715/788
6,785,683 B1 * 8/2004 Zodik ................. G06F 16/35

(Continued)

FOREIGN PATENT DOCUMENTS

CN         105049420 A      11/2015

OTHER PUBLICATIONS

Messa et al, "Visual Software Development Using an Object-Relationship Model", [Online], 1999, pp. 1-7, [Retrieved from Internet on Jun. 10, 2020], <https://dl.acm.org/doi/pdf/10.1145/306363.306380> (Year: 1999).*

(Continued)

Primary Examiner — Ziaul A Chowdhury
Assistant Examiner — Zengpu Wei
(74) Attorney, Agent, or Firm — Haynes and Boone LLP

(57) ABSTRACT

Methods, systems, and computing systems are provided for providing a visual representation of a domain model. An example method includes providing a class corresponding to a first stencil. The class is annotated to include a definition, a property, and a rule. A visual representation of the first stencil is provided in a graphical user interface, where the annotated definition and the annotated property modify the visual representation that is displayed. When the visual representation is moved, by a user, in relation to a second stencil, a determination is made, based on the location of the moved first stencil and the second stencil, that the first stencil violates the rule. The visual representation of the moved first stencil is modified to indicate the violation of the rule.

13 Claims, 4 Drawing Sheets

(56) References Cited

U.S. PATENT DOCUMENTS

| | | | |
|---|---|---|---|
| 7,089,530 B1* | 8/2006 | Dardinski | G05B 15/02 |
| | | | 700/83 |
| 8,260,643 B2 | 9/2012 | Benayon et al. | |
| 8,296,737 B2* | 10/2012 | Carteri | G06F 8/10 |
| | | | 717/105 |
| 8,401,687 B2 | 3/2013 | Kohlhoff | |
| 8,561,016 B2 | 10/2013 | Berg et al. | |
| 9,508,178 B2* | 11/2016 | Jutan | G06T 13/40 |
| 2004/0111702 A1 | 6/2004 | Chan | |
| 2006/0041877 A1* | 2/2006 | Harsh | G06F 9/451 |
| | | | 717/162 |
| 2008/0092109 A1* | 4/2008 | Kinnucan, Jr. | G06F 8/10 |
| | | | 717/105 |
| 2008/0109791 A1* | 5/2008 | Carteri | G06F 8/10 |
| | | | 717/128 |
| 2013/0080140 A1* | 3/2013 | Behr | G06F 8/10 |
| | | | 703/21 |
| 2014/0214396 A1 | 7/2014 | Adir et al. | |
| 2015/0077326 A1* | 3/2015 | Kramer | G06F 3/0325 |
| | | | 345/156 |
| 2016/0180231 A1* | 6/2016 | Chessell | G06F 8/20 |
| | | | 706/46 |
| 2017/0039683 A1* | 2/2017 | Yamamoto | G06T 7/11 |
| 2017/0235436 A1* | 8/2017 | Hooton | G06F 3/0486 |
| | | | 705/7.11 |
| 2017/0242667 A1* | 8/2017 | Kotman | G16B 50/00 |
| 2017/0352174 A1* | 12/2017 | Gorishniy | G06F 16/904 |
| 2019/0043231 A1* | 2/2019 | Uzgin | G06F 16/54 |

OTHER PUBLICATIONS

Yacoub et al, "Automating the Development of Pattern-Oriented Designs for Application Specific Software Systems", [Online], 2000, pp. 1-8, [Retrieved from Internet on Jun. 10, 2020], <https://ieeexplore.ieee.org/stamp/stamp.jsp?tp=&arnumber=888071> (Year: 2000).*

Grigorenko et al, "Visual Tool for Generative Programming", [Online], 2005, pp. 249-252, [Retrieved from Internet on Jun. 10, 2020], <https://dl.acm.org/doi/pdf/10.1145/1081706.1081747> (Year: 2005).*

Ong, James C., et al., "A Visual Integrated Development Environment for Automated Planning Domain Models" American Institute of Aeronautics and Astronautics, 10 pgs. (2013).

Kuhrmann, Marco, et al., "Visual Process Model Design using Domain-Specific Languages", Technische Universitat Munchen Institut for Informatik—Software & Systems Engineering, 4 pgs. (2010).

"Organize Domain and Implementation Model" https://www.visual-paradigm.com/tutorials/developdomainandimplclassmodel.jsp, (2016).

* cited by examiner

US 10,817,268 B2

FRAMEWORK FOR MODELING WITH DOMAIN MODEL CAPABILITIES

FIELD OF DISCLOSURE

The present disclosure relates generally to data processing and modeling, and more specifically to software development and program execution analysis.

BACKGROUND

Model-driven engineering is a software development methodology that focuses on the creation and use of domain models, and is used to increase productivity and to simplify the process of design. A domain model is a system that describes selected aspects of a sphere of knowledge, influence, or activity. For example, domain models may be used as a representation of practical concepts to be modeled by computing systems. For example, domain models can be used as conceptual models of all the topics that are related to a specific problem, and may incorporate behavior and data.

Conventional visual representation tools exist that allow users to create diagrams to show relationships between various elements. For example, conventional visual representation tools allow for users to draw shapes and nodes, as well as connecting lines that symbolize the relationships between the shapes and nodes. These representations may be used, for example, to show the flow of events, hierarchy between relationships, or to diagram a system architecture.

SUMMARY

A system of one or more computers can perform particular operations or actions by virtue of having software, firmware, hardware, or a combination thereof installed on the system that in operation causes the system to perform the actions. One or more computer programs can perform particular operations or actions by virtue of including instructions that, when executed by data processing apparatus, cause the apparatus to perform the actions. One general aspect includes a method including: providing a class corresponding to a first stencil; annotating the class to include a definition, a property, and a rule; providing a visual representation of the first stencil in a graphical user interface, the annotated definition and the annotated property modifying the visual representation that is displayed; moving, by a user, the visual representation of the first stencil in relation to a second stencil; determining, based on the location of the moved first stencil and the second stencil, that the moved first stencil violates the rule; and modifying the visual representation of the moved first stencil to indicate the violation of the rule. Other examples of this aspect include corresponding computer systems, apparatus, and computer programs recorded on one or more computer storage devices, each to perform the actions of the methods.

One general aspect includes a non-transitory machine-readable medium having stored thereon machine-readable instructions executable to cause a machine to perform operations including: providing a class corresponding to a first stencil; annotating the class to include a definition, a property, and a rule; providing a visual representation of the first stencil in a graphical user interface, the annotated definition and the annotated property modifying the visual representation that is displayed; moving, by a user, the visual representation of the first stencil in relation to a second stencil; determining, based on the location of the moved first stencil and the second stencil, that the moved first stencil violates the rule; and modifying the visual representation of the moved first stencil to indicate the violation of the rule. Other examples of this aspect include corresponding computer systems, apparatus, and computer programs recorded on one or more computer storage devices, each to perform the actions of the methods.

One general aspect includes a system including: a non-transitory memory storing a class corresponding to a first stencil, the class having annotations that include a definition, a property, and a rule; one or more hardware processors coupled to the non-transitory memory and to execute instructions to cause the system to perform operations including: providing a visual representation of the first stencil in a graphical user interface, the annotated definition and the annotated property modifying the visual representation that is displayed; moving, by a user, the visual representation of the first stencil in relation to a second stencil; determining, based on the location of the moved first stencil and the second stencil, that the moved first stencil violates the rule; and modifying the visual representation of the moved first stencil to indicate the violation of the rule. Other examples of this aspect include corresponding computer systems, apparatus, and computer programs recorded on one or more computer storage devices, each to perform the actions of the methods.

DETAILED DESCRIPTION

Figure 1:
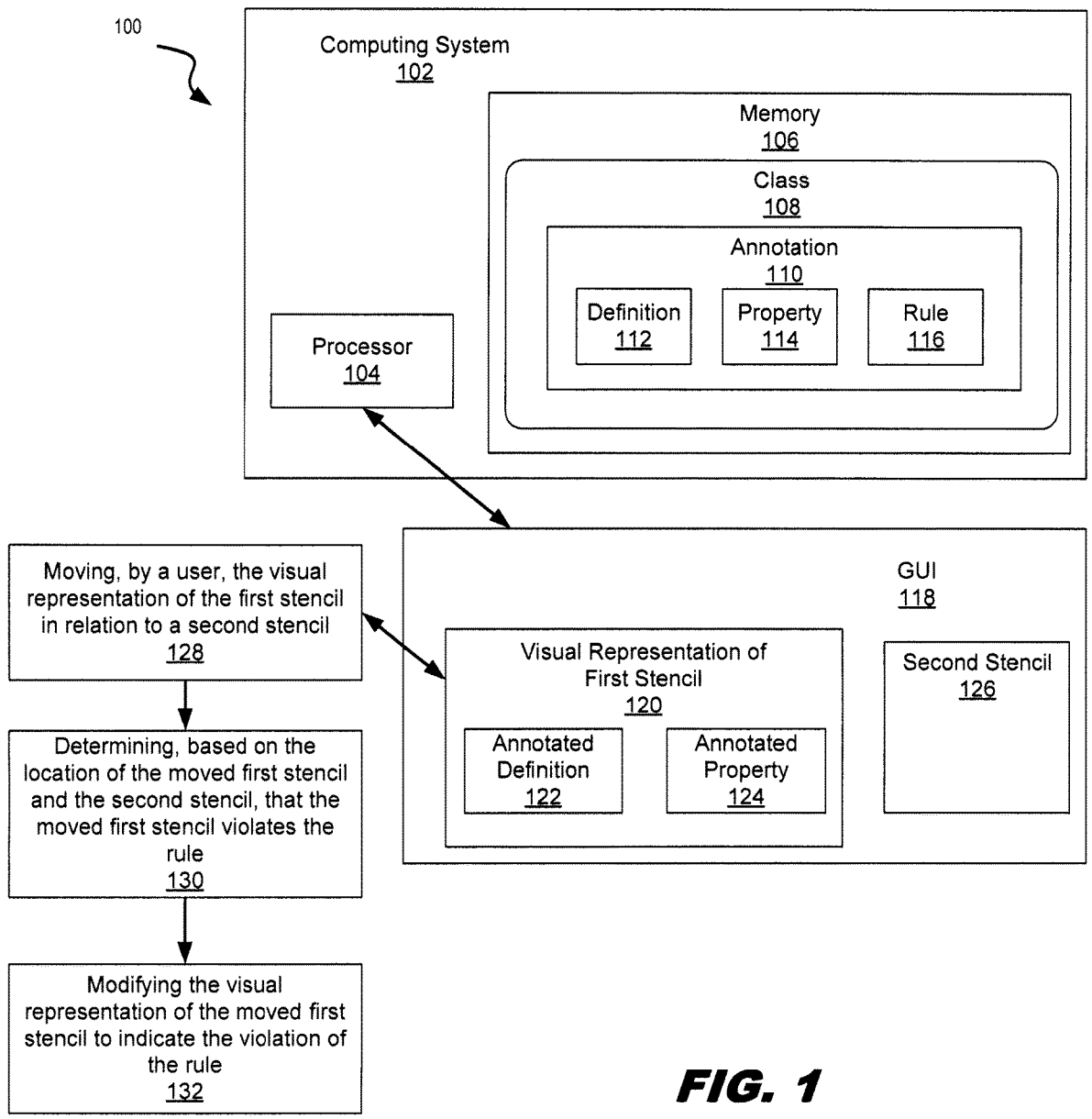
FIG. 1 is an organizational diagram illustrating a system that displays visual representations of stencils and modifies the visual representations based on annotations of the stencils, in accordance with various examples of the present disclosure.

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

Conventional creation of domain models is a cumbersome and time consuming process. Developers of the domain model are required to have a deep knowledge of how a domain model framework works in order to develop the domain model. Moreover, domain models are usually based on classes, such as Java classes, and therefore must be adapted to the relevant visual framework. Conventionally, any integration of existing domain models into a visual framework is difficult and requires adapting the domain into the framework's internal domain, by forcing user to write imperative code that does not provide any additional features or solve any problem, but merely is to integrate the existing domain models into the framework.

As described herein, techniques that address the problem outlined above allow users/software developers to integrate domain models into a framework in a visual manner that is more efficient and less cumbersome than the conventional techniques. In more detail, canvas technologies are provided that provide an improved user experience and simplify the integration of the domain models into a visual framework. These canvas technologies may be implemented, for example, in a browser that provides a visual representation of the domain models. In more detail, the techniques describe herein allow source code to be modeled, while providing real time feedback. This solution also allows developers to modify and develop source code through domain models without requiring in-depth knowledge of the particular software code.

As a simple example to illustrate the advantages of these technologies, consider a domain model that includes a set of software classes. The software classes describe the domain model, and can be annotated to visually define the domain model, thus resulting in different images/shapes on a graphical user interface that represent the different classes in the domain model. The representations of these classes may then be moved around on a graphical user interface and/or connected to represent different relationships between the classes.

The techniques described herein provide numerous advantages, including simplifying software code development, efficiently integrating domain models into a visual representation, and saving user time and resources by allowing re-use of domain model classes.

FIG. 1 is an organizational diagram illustrating a system 100 that displays visual representations of stencils and modifies the visual representations based on annotations of the stencils, in accordance with various examples of the present disclosure.

The system 100 includes a computing system 102. In the present example, the computing system 102 is structured as a computing device, such as a desktop computer, laptop computer, handheld/mobile computing device, or other computing device. In some examples, each computing system 102 may include a plurality of machines.

The computing system 102 is structured with hardware, which includes physical elements such as one or more processors (e.g., processor 104) and one or more memory devices (e.g., memory 106). In more detail regarding the processor 104, the processor is structured to include one or more general-purpose processing devices such as a microprocessor, central processing unit (CPU), and the like. More particularly, the processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some examples, the processor is structured to include one or more special-purpose processing devices such as an application specific integrated circuit (ASIC), a field programmable gate array (FPGA), a digital signal processor (DSP), network processor, and so forth. The processor executes instructions for performing the operations, steps, and actions discussed herein.

In more detail regarding the memory 106, the memory 106 is structured to include at least one computer-readable storage medium on which is stored one or more set of instructions (e.g., software) including any one or more of the methodologies or functions described herein. The memory 106 may be structured to include one or more of a read-only memory (ROM), flash memory, dynamic random access memory (DRAM) such as synchronous DRAM (DFRAM), double data rate (DDR SDRAM), or DRAM (RDRAM), and so forth, static memory (e.g., flash memory, static random access memory (SRAM), and so forth), and a data storage device (e.g., a hard disk drive (HDD), solid state drive (SSD), and so forth). Accordingly, any of the operations, steps, and actions of the methods described herein may be implemented using corresponding machine-readable instructions stored on or in a non-transitory machine-readable medium that are executable by the processor 104.

The memory is structured to store at least one class 108 that corresponds to a first stencil 120. In some cases, a class 108 is a defined data type that may include constants, variables, and functions for operating with those constants, variables, or inputs to a class. In some examples, the source code of class 108 is written in Java. Various other programming languages may be used. For example, Ruby, Python, or C# may be other programming languages that may be used to provide the source code of class 108.

In more detail regarding the class 108, the class 108 is structured to include at least one annotation 110. The annotation 110 may be created, for example, by a software developer by inputting a pre-defined symbol into the class, the symbol being accompanied by at least one pre-defined definition 112, property 114, and/or rule 116. In some examples, the "@" symbol indicates an annotation. In other examples, other symbols or alpha-numeric strings may be used to indicate an annotation. Annotations 110 may be positioned in different locations with respect to the class 108. For example, the source code below shows annotations 110 positioned before class 108.

```
@Definition( graphFactory = Nodefactory.class)
@Shape( factory = BasicShapesFactory.class,
        Def = TaskShapeDef.class )
public abstract class BaseTask {
}
```

By way of further example, the source code below shows annotations 110 positioned within class 108.

```
public abstract class BaseTask {
    @Description
    public String description = "A task is a unit of work - the job
    to be performed";
}
```

The annotation 110 is structured to include at least one definition 112, property 114, and/or rule 116. The definition 112 may include a category, a title, a description, and/or a label. The property 114 may include a type, a caption, a description, and/or a value. Furthermore, the rule 116 may include a connection rule, a containment rule, and/or a cardinality rule. Examples of annotations are described further with respect to FIG. 2.

The computing system 102 includes a graphical user interface (GUI). For example, the GUI includes a screen that contains a canvas to display the stencils. By way of further example, the GUI also includes a screen that displays the source code of the classes 108 for the user to insert annotations 110 into the source code of the classes 108. In the present example, the computing system 102 includes one or more input devices, such as a mouse, touchpad, or touchscreen that receives input from a user to cause the computing system 102 to modify visual representations that are displayed on the GUI 118. In the present example, the GUI 118 includes a one or more output devices, such as a monitor or a touchscreen. The GUI 118 displays visual representations to a user to allow the user to interact with the computing system 102. Furthermore, the GUI 118 allows a user to interact with the source code of class 108, by allowing the user to create, edit, or remove the annotation 110.

The GUI 118 may display the visual representation of the first stencil 120. For example, the first stencil 120 may be a geometric shape, an icon, an image, and/or alphanumeric textual representation. The first stencil 120 is instantiated based on the class 108, which may include annotations 110, and is a representation of the class 108. For example, the first stencil 120 is a way of visually defining the class 108. The GUI 118 may also display a second stencil 126 at the same time it displays the visual representation of the first stencil 120. For example, the second stencil 126 may also be a geometric shape, an icon, an image, and/or alphanumeric textual representation. The second stencil 126 may be based on the same class 108 as the first stencil 120, or the second stencil 126 may be based on a different class. The second stencil 126 may also be based on a class 108 that may have annotations 110. The annotations 110 may be the same or different as the annotations 110 provided with respect to the class 108. Furthermore, the visual representation of the first stencil 120 may be modified by the annotated definition 122 and the annotated property 124. For example, the annotated definition 122 may modify the label of the visual representation of the first stencil 120. By way of further example, the annotated property 124 may modify the shape of the visual representation of the first stencil 120.

A user may move 128 the visual representation of the first stencil 120 in relation to the second stencil 126. The movement may be done by, for example, selecting the visual representation via a pointer and dragging the visual representation with a mouse. By way of further example, the visual representation of the first stencil 120 may be moved by the user selecting the visual representation of the first stencil 120 via a touchscreen. In some examples, the visual representation of the first stencil 120 is moved in relation to a second stencil 126 by the visual representation of the first stencil 120 being connected to the second stencil 126 via a connector. In other examples, the visual representation of the first stencil 120 is moved closer or further in proximity with respect to the second stencil 126. In yet other examples, the visual representation of the first stencil 120 is moved to be inside the second stencil 126, such that the second stencil 126 contains the first stencil 120, or outside the second stencil 126.

In the present example, the computing system 102 makes a determination, based on the location of the visual representation of the first stencil 120 and the second stencil 126. For example, the determination 130 may be that the movement of the visual representation of the first stencil 120 violates the rule 116. A violation of a rule 116 may be that a condition of the rule 116 is satisfied. In some examples, a rule 116 is that the visual representation of the first stencil 120 may have one connector. If the visual representation of the first stencil 120 is modified so that it has only one connector, a condition of the rule 116 is satisfied. By way of further example, a violation of a rule 116 may occur when a condition of the rule 116 is violated. In some examples, a rule 116 is that the visual representation of the first stencil 120 is limited to one connector. If the visual representation of the first stencil 120 is modified so that it has two connectors, a condition of the rule 116 is violated. By way of further example, a violation of a rule 116 may occur when there is less than a condition of the rule 116. For example, a rule 116 may be that the visual representation of the first stencil 120 must have at least three connectors. If the visual representation of the first stencil 120 is modified so that it has two connectors, a violation of rule 116 occurs. By way of further example, a violation of a rule 116 may occur when there is more than a condition of the rule 116. For example, a rule 116 may be that the visual representation of the first stencil 120 is limited to three connectors. If the visual representation of the first stencil 120 is modified so that it has four connectors, a violation of rule 116 occurs. Additional rules, including connection rules, containment rules, and cardinality rules are described in further detail with respect to FIG. 2.

As a result, in response to the violation of the rule 116, the visual representation of the first stencil 120 may be modified 132 to indicate the violation of the rule 116. Examples of the modification may include the first stencil 120 and/or the second stencil 126 changing color, changing shape, or being placed back in their original locations. Furthermore, examples of the modification may also include a connector changing shape or color, a dialogue box displaying an alert, or the screen changing color. For example, if the determination is that the movement of the visual representation of the first stencil 120 does not violate the rule, the visual representation of the first stencil 120 may not be modified.

Figure 2:
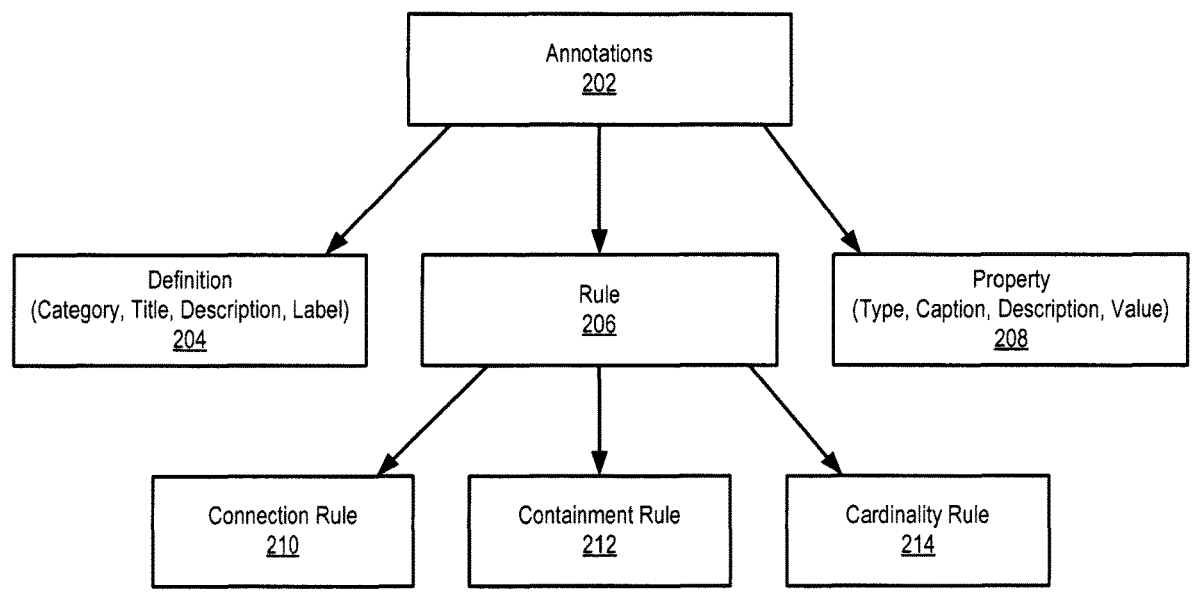
FIG. 2 is an organizational diagram illustrating definitions, rules, and properties for annotating classes corresponding to stencils, in accordance with various examples of the present disclosure.

FIG. 2 is an organizational diagram illustrating definitions, rules, and properties for annotating classes corresponding to stencils, in accordance with various examples of the present disclosure.

In the present example, the annotation 202 may include at least a definition 204, rule 206, and property 208. The definition 204 may include, for example, a category, title, description, or label. For example, the category, title, description, and label may be string types that are used for the definition's metadata. In some examples, the category is used for grouping and organizational purposes, which allows certain definitions to be semantically linked or grouped together in the GUI. Furthermore, the title and description, may be used to provide information to present to the user to describe a certain definition. In some examples, the definition is longer and more descriptive than the title. In some examples, the label is a single string or a collection of strings that describes the semantics and behavior expected for each definition, and specifies the role/s that the definition takes.

The rule 206 may provide, for example, structure consistency and valid relationships. The rule 206 may be at least a connection rule 210, containment rule 212, or a cardinality rule 214. The connection rule 210 may, for example, define stencils that can be composed by other stencils. For example, a connection may be a line that joins at least two stencils together. The connection may also join at least two nodes with each other, or join at least one node and at least one stencil. For example, a connection rule 210 may be used in parent-child graphs to show which children a parent may compose by having a connection line between the parent and the children. Additionally, for example, a connection rule 210 may limit the number of connections that a class may have to a minimum and/or a maximum number of connections. Additionally, a connection rule 210 may limit the type of connections that a class may have. For example, a connection rule 210 may say that a class can only have one incoming connection. A containment rule 212 may, for example, define elements, such as connectors, nodes, or stencils, that may or may not contain other elements. For example, a class may be able to contain other specified classes, which may be shown in the GUI by a stencil inside another stencil. A cardinality rule 214 may, for example, define how many elements, such as connectors, nodes, or stencils, can be displayed in the GUI. For example, a cardinality rule 214 may provide support for a stencil's node and edge cardinality.

In the present example, the property 208 may include a type, caption, description, or value. A type may specify the kind of property and the expected kind of value. For example, a default built in property type such as a string, color, decimal, or number. By way of further example, the caption may provide the description used to present the property in the GUI, and may be the information that will be displayed to the user within the value of the property. In some examples, the caption is a short description about the property, whereas the description may be used to add additional and more accurate information for the property. There may exist, in some examples, an area in the GUI that allows the user to read the description and provide a better understanding of the property and its goals. The value, for example, may specify which class member holds the value for a concrete property instance. For example, the value may be any object and may be of the type that is specified. In some examples, the type, caption, and description are read-only and provide information about the property; whereas, in some example, the value may be read and set, and the user may change the value via the GUI.

Figure 3:
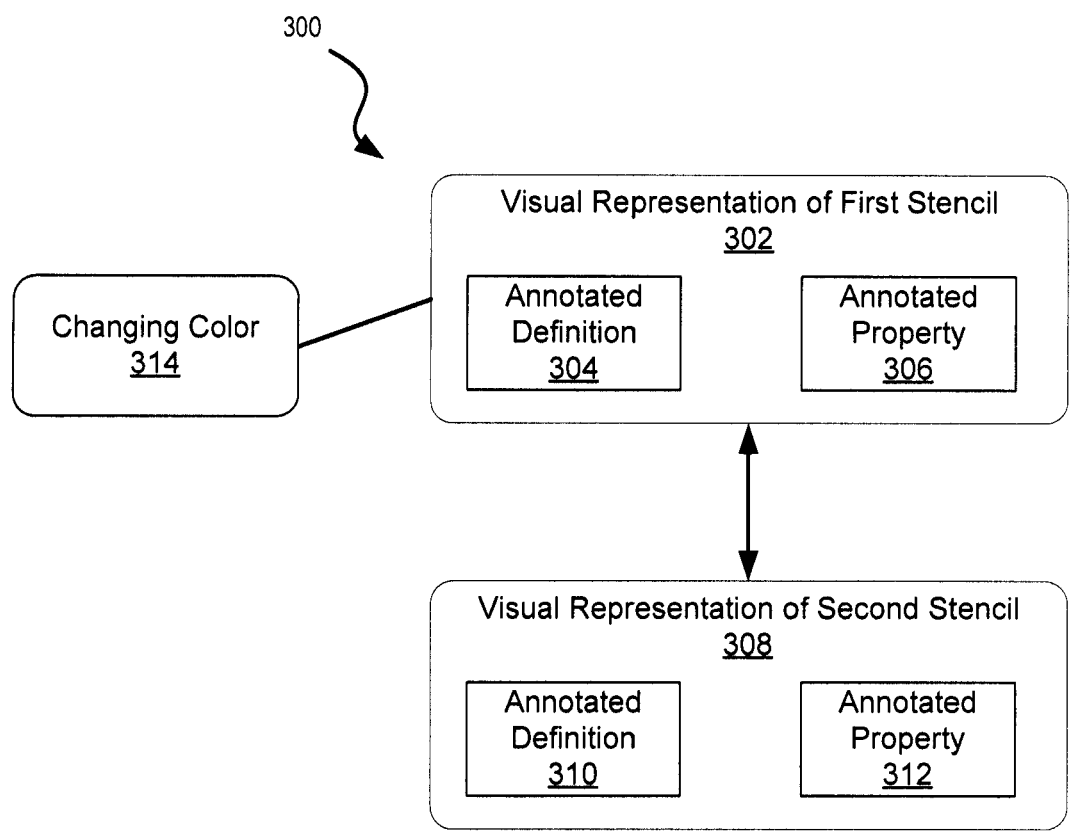
FIG. 3 is an organizational diagram illustrating a system that displays visual representations of stencils and modifies the visual representations based on annotations of the stencils, in accordance with various examples of the present disclosure.

FIG. 3 is an organizational diagram illustrating a system 300 that displays visual representations of stencils and modifies the visual representations based on annotations of the stencils, in accordance with various examples of the present disclosure.

In the present example, the system 300 includes a visual representation of the first stencil 302. The visual representation of the first stencil 302 is modified by an annotated definition 304 and an annotated property 306 of the class corresponding to the visual representation of the first stencil 302. For example, the annotated definition 304 may modify the label of the visual representation of the first stencil 302 that is displayed in a GUI. Furthermore, for example, the annotated property 306 may modify the shape of the visual representation of the first stencil 302.

In the present example, the system 300 also includes a visual representation of the second stencil 308. The visual representation of the second stencil 308 is modified by an annotated definition 310 and an annotated property 312. For example, the annotated definition 310 may modify the label of the visual representation of the second stencil 308. Furthermore, for example, the annotated property 312 may modify the shape of the visual representation of the second stencil 308.

In the present example, a user may move the visual representation of the second stencil 308 so that it is in violation of a rule of the visual representation of the first stencil 302. For example, the rule may be that the visual representation of the first stencil 302 cannot contain any other stencils. Accordingly, in this example, if the user moves the visual representation of the second stencil 308 so that the visual representation of the second stencil is inside of the visual representation of the first stencil 302, the containment rule is violated. In more detail, the system 300 may identify the locations of the visual representation of the first stencil 302 and the visual representation of the second stencil 308, and compare the locations to determine that the visual representation of the first stencil 302 contains the visual representation of the second stencil 308. The system 300 may then determine that is a violation of the rule that specifies that the first stencil may not contain any other stencils. As a result, the system 300 may modify the color of the visual representation of the first stencil at action 314 to indicate the violation of the rule corresponding to the first stencil 302. For example, an outline or highlight of the visual representation 302 and/or visual representation 308 may be changed to red or other color to indicate a violation of the rule.

Figure 4:
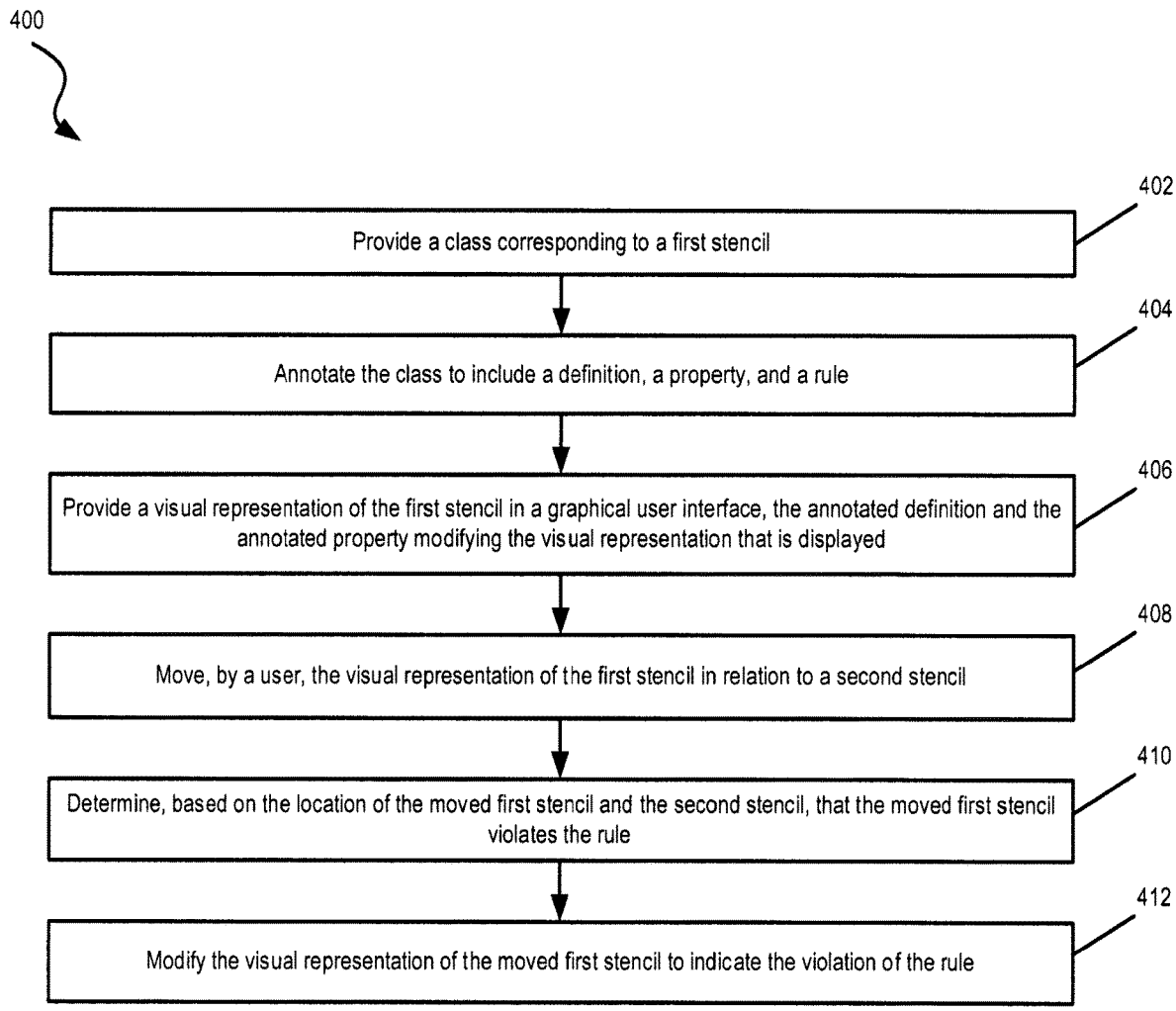
FIG. 4 is a flow diagram illustrating a method for providing a visual representation of a stencil and applying rules to the visual representation based on the annotations including in the class corresponding to the stencil, in accordance with various examples of the present disclosure.

FIG. 4 is a flow diagram illustrating a method 400 for providing a visual representation of a stencil and applying rules to the visual representation based on the annotations including in the class corresponding to the stencil, in accordance with various examples of the present disclosure. In some examples, the method is performed by executing computer-readable instructions that are stored in a non-transitory memory using one or more processors. The non-transitory memory and processors may be provided by, for example, the hardware described with respect to FIG. 1. For example, the method may be performed by the computing system 102 that is described in further detail with respect to FIG. 1.

At action 402, a class corresponding to a first stencil is provided. For example, the class may be provided as source code in a textual format in one or more files. In some examples, the source code is written in Java. The class may be provided by one or more users entering text and/or accessing source code that is already written to re-use an entire class or a portion of a class.

At action 404, the class is annotated to include a definition, a property, and/or a rule. In the present example, the annotation may be added to the source code by the user. In other examples, annotations may be automatically added by the software, or the user may select which annotations are automatically added. The definition may include, for example, a category, title, description, and/or label. In the present example, the property may include a type, caption, description, and/or value. The rule may provide, for example, structure consistency and indicate valid relationships between the class and classes corresponding to other stencils. The rule may include a connection rule, containment rule, and/or a cardinality rule.

At action 406, a visual representation of the first stencil is provided in a GUI, and the annotated definition and the annotated property modify the visual representation of the first stencil that is displayed. For example, the visual representation of the first stencil may be provided in the GUI by parsing the class and extracting the annotations. After the annotations are extracted, the modeling software may provide the visual representation of the first stencil based on the extracted annotations, as well as other information in the class. For example, the annotated definition may modify the text of the visual representation of the first stencil. Furthermore, for example, the annotated property may modify the color or shape of the visual representation of the first stencil.

At action 408, the user may move the visual representation of the first stencil in relation to a second stencil. Additionally, for example, the visual representation of the first stencil may be moved in relation to a second stencil by the visual representation of the first stencil being connected to the second stencil via a connector, or by the visual representation of the first stencil being moved to be closer to the second stencil, or so that the second stencil contains the visual representation of the first stencil. For example, the visual representation of the first stencil may be moved by the user selecting the visual representation of the first stencil via a pointer, and dragging the visual representation of the first stencil. By way of further example, the visual representation of the first stencil may be moved by the user selecting the visual representation of the first stencil via a touchscreen.

At action 410, it is determined, based on the location of the moved first stencil and the second stencil, that the moved first stencil violates the rule. For example, the location of the first stencil with respect to a second stencil, may trigger a determination that a rule corresponding to the first stencil has been violated. In other examples, other user actions with respect to the visual representations of the stencils may trigger determinations that other rules are violated. By way of further example, a connection rule, containment rule, or a cardinality rule may be violated. For example, a connection rule may be violated because connections were created that exceed a specified maximum, or a containment rule may be violated because the second stencil is limited by an annotation that specifies that the second stencil cannot contain other stencils, or a cardinality rule may be violated because a number of elements is present that exceeds a limit that is specified by an annotation.

At action 412, the visual representation of the moved first stencil is modified to indicate the violation of the rule. For example, the visual representation of the moved first stencil may change shape or color to indicate the violation of the rule.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure. Although illustrative examples have been shown and described, a wide range of modification, change and substitution is contemplated in the foregoing disclosure and in some instances, some features of the examples may be employed without a corresponding use of other features. In some instances, actions may be performed according to alternative orderings. One of ordinary skill in the art would recognize many variations, alternatives, and modifications. Thus, the scope of the invention should be limited only by the following claims, and it is appropriate that the claims be construed broadly and in a manner consistent with the scope of the examples disclosed herein.

What is claimed is:

1. A method comprising one or more computer instructions to perform particular operations including instructions that, when executed by data processing apparatus, cause the apparatus to perform the following method:
   providing a class corresponding to a first stencil, wherein the class defines a software domain model;
   annotating the class to include a definition, a property, and a rule, the definition including a category, a title, a description, and a label, wherein the category, title, description, and label are string types used for metadata belonging to the definition, wherein the category groups the definition with at least one other definition, wherein the property includes a type, wherein the type specifies a property kind and a property kind value, wherein the rule is one of a plurality of rules that include a connection rule, a containment rule, and a cardinality rule, wherein the connection rule specifies connections that are allowed between the first stencil and the second stencil, wherein the containment rule specifies that the first stencil is composed by another stencil;
   providing a visual representation of the first stencil in a graphical user interface, the definition and the property modifying the visual representation that is displayed, wherein the rule constrains placement of the visual representation of the first stencil with respect to other visual representations;
   moving, by a user, the visual representation of the first stencil in relation to a visual representation of a second stencil, wherein the second stencil corresponds to either the class or a different class;
   determining, based on the location of the moved visual representation of the first stencil and the second stencil, that the moved visual representation of the first stencil violates the rule; and
   modifying the visual representation of the first stencil to indicate the violation of the rule.

2. The method of claim 1, wherein the modifying of the visual representation includes changing a color of the first stencil.

3. The method of claim 1, wherein the property includes a caption, a description, and a value.

4. The method of claim 1, wherein the cardinality rule defines a minimum number of connections and a maximum number of connections that are allowed for the first stencil.

5. The method of claim 1, wherein the visual representation includes a geometric shape.

6. The method of claim 1, wherein the label describes the behavior expected for the definition.

7. A non-transitory machine-readable medium having stored thereon machine-readable instructions executable to cause a machine to perform operations comprising:
   providing a class corresponding to a first stencil, wherein the class defines a software domain model;
   annotating the class to include a definition, a property, and a rule, the definition including a category, a title, a description, and a label, wherein the category, title, description, and label are string types used for metadata belonging to the definition, wherein the category groups the definition with at least one other definition, wherein the property includes a type, wherein the type specifies a property kind and a property kind value, wherein the rule is one of a plurality of rules that include a connection rule, a containment rule, and a cardinality rule, wherein the connection rule specifies connections that are allowed between the first stencil and the second stencil, wherein the containment rule specifies that the first stencil is composed by another stencil;
   providing a visual representation of the first stencil in a graphical user interface, the annotated definition and the annotated property modifying the visual representation that is displayed, wherein the rule constrains placement of the visual representation of the first stencil with respect to other visual representations;
   moving, by a user, the visual representation of the first stencil in relation to a visual representation of a second stencil, wherein the second stencil corresponds to either the class or a different class;

determining, based on the location of the visual representation of the first stencil and the second stencil, that the first stencil violates the rule; and modifying the visual representation of the first stencil to indicate the violation of the rule.

8. The medium of claim 7, wherein the property includes a caption, a description, and a value.

9. The medium of claim 7, wherein the cardinality rule defines a minimum number of connections and a maximum number of connections that are allowed for the first stencil.

10. The medium of claim 7, wherein the label describes the behavior expected for the definition.

11. A system comprising:

a non-transitory memory storing a class corresponding to a first stencil, wherein the class defines a software domain model, the class having annotations that include a definition, a property, and a rule, the definition including a category, a title, a description, and a label, wherein the category, title, description, and label are string types used for metadata belonging to the definition, wherein the category groups the definition with at least one other definition, wherein the property includes a type, wherein the type specifies a property kind and a property kind value, wherein the rule is one of a plurality of rules that include a connection rule, a containment rule, and a cardinality rule, wherein the connection rule specifies connections that are allowed between the first stencil and the second stencil, wherein the containment rule specifies that the first stencil is composed by another stencil;

one or more hardware processors coupled to the non-transitory memory and that execute instructions to cause the system to perform operations comprising:

providing a visual representation of the first stencil in a graphical user interface, the annotated definition and the annotated property modifying the visual representation that is displayed, wherein the rule constrains placement of the visual representation of the first stencil with respect to other visual representations;

moving, by a user, the visual representation of the first stencil in relation to a visual representation of a second stencil, wherein the second stencil corresponds to either the class or a different class;

determining, based on the location of the visual representation of the first stencil and the second stencil, that the first stencil violates the rule; and modifying the visual representation of the first stencil to indicate the violation of the rule.

12. The system of claim 11, wherein the property includes a caption, a description, and a value.

13. The system of claim 11, wherein the label describes the behavior expected for the definition.

* * * * *